United States Patent [19]
Gewanter et al.

[11] Patent Number: 5,293,942
[45] Date of Patent: Mar. 15, 1994

[54] OIL WELL ACIDIZING WITH IRON CHELATING DERIVATIVES OF ALDOHEXOSES AND ALDOPENTOSES SUCH AS A SALT OR ACID OF 2-KETOGLUCONATE

[75] Inventors: Herman L. Gewanter, Waterford; Sandra I. Graham, Mystic; Joseph M. Rashan, Jr., Waterford; R. Larry Reitz, Salem, all of Conn.

[73] Assignee: Pfizer Inc., New York, N.Y.

[21] Appl. No.: 840,375

[22] Filed: Feb. 24, 1992

[51] Int. Cl.$^5$ .............................................. E21B 43/27
[52] U.S. Cl. ................... 166/307; 252/8.553
[58] Field of Search ......... 166/307, 300, 279; 252/8.553

[56] References Cited

U.S. PATENT DOCUMENTS

| | | | |
|---|---|---|---|
| 4,000,083 | 12/1976 | Heesen | 252/135 |
| 4,001,133 | 1/1977 | Sorgenfrei et al. | 252/156 |
| 4,017,410 | 4/1977 | Sorgenfrei et al. | 252/156 |
| 4,451,442 | 5/1984 | Jeffrey et al. | 423/224 |
| 4,455,287 | 6/1984 | Primack et al. | 423/573 R |
| 4,574,050 | 3/1986 | Crowe et al. | 252/8.55 C |
| 4,652,435 | 3/1987 | Natsuume et al. | 423/265 |
| 4,960,527 | 10/1990 | Penny | 252/8.551 |
| 5,114,618 | 5/1992 | Gewanter et al. | 252/389.53 |
| 5,167,835 | 12/1992 | Harder | 210/750 |
| 5,178,796 | 1/1993 | Gewanter et al. | 252/389.53 |

OTHER PUBLICATIONS

Mehltretter, CL, et al, "Sequestration of Sugar Acids" *Industrial and Engineering Chemistry*, vol. 45, No. 12, Dec. 1953, pp. 2782-2784.

Williams et al, *Acidizing Fundamentals*, Chapters 1, 3, 4, 5, 6, 7, 8, Society of Petroleum Engineers of AIME, New York, 1979.

Smith et al, *Secondary Deposition of Iron Compounds Following Acidizing Treatments*, Society of Petroleum Engineers paper No. 2358, presented at the SPE-AIME Eastern Regional Meeting, Charleston, W.V., Nov. 7-8, 1968.

*Primary Examiner*—Gary Geist
*Attorney, Agent, or Firm*—Peter C. Richardson; Paul H. Ginsburg; Karen DeBenedictis

[57] ABSTRACT

This invention relates to the use of certain keto and diketo acids, esters and salts that are derived from aldopentoses and aldohexoses, to maintain very high levels of iron in solution under oil well acidizing conditions. The compounds described herein chelate ferric iron at low temperatures and are activated by heat to reduce ferric iron to the more soluble ferrous species at high temperatures. Because of these properties and their extraordinarily high solubility in hydrochloric acid, such compounds are capable of maintaining considerably more iron in solution than competing materials.

34 Claims, No Drawings

OIL WELL ACIDIZING WITH IRON CHELATING DERIVATIVES OF ALDOHEXOSES AND ALDOPENTOSES SUCH AS A SALT OR ACID OF 2-KETOGLUCONATE

BACKGROUND OF THE INVENTION

This invention relates to the use of certain keto and diketo acids, esters and salts that are derived from aldohexoses and aldopentoses, to maintain very high levels of iron in solution under oil well acidizing conditions. The compounds described herein chelate ferric iron at low temperatures and are activated by heat to reduce ferric iron to the more soluble ferrous species at high temperatures. Because of these properties and their extraordinarily high solubility in hydrochloric acid, such compounds are capable of maintaining considerably more iron in solution than competing materials.

When the formation around oil producing wells become plugged with acid soluble minerals, the flow of fluid through the oil bearing formation is reduced and oil production falls. Wells can be stimulated to produce at higher levels by forcing acid into the formation to dissolve the minerals that are causing the problem. The acid readily dissolves iron and iron containing compounds both from the well casing and the formation. As the acid is neutralized by water and carbonates in the formation, iron will re-precipitate as ferric hydroxide above a pH of 2.2 unless suitable chemicals are added to maintain it in a soluble state.

Two approaches have been used to control reprecipitation of iron as acid is spent and the pH rises, sequestration by organic chelants and reduction to the more soluble ferrous ion. Commonly used organic chelants include citric acid, gluconic acid, the tetrasodium salt of ethylenediaminetetraacetic acid (EDTA), and the trisodium salt of nitrilotriacetic acid (NTA). Smith, et al., *Secondary Deposition of Iron Compounds Following Acidizing Treatments*, paper SPE (Society of Petroleum Engineers) 2358 presented at the SPE-AIME (American Institute of Mining, Metallurgical and Petroleum Engineers) Eastern Regional Meeting, Charleston, W. VA., Nov. 7-8, 1.68), have discussed the relative merits of each. Gluconic acid is ineffective at elevated temperatures. Citric acid, is effective only at low temperatures. Also, the formation of insoluble calcium citrate limits the level at which it can be used. EDTA is effective at high temperatures and is not prone to precipitation as the calcium salt. However, it is of limited solubility in hydrochloric and other acids. NTA is effective without having the negative attributes of either EDTA or citric acid. NTA, however, has been proven to cause cancers in laboratory animals. (See Chemical Status Report issued by the National Toxicology Program, Division of Toxicology Research and Testing, Oct. 8, 1991, p 25.)

While ferric iron will precipitate as the pH rises above 2.2, ferrous iron remains soluble up to a pH of about 7. Erythorbic acid and sodium erythorbate have been used commercially to control the concentration of dissolved iron in acidizing operations by reducing the ferric iron to the more soluble ferrous species. Crowe et al., in U.S. Pat. No. 4,574,050, argue that this approach is effective in maintaining substantially more iron in solution than can be maintained using the above-mentioned chelating agents.

An ideal additive for controlling the concentration of dissolved iron under oil well acidizing conditions should have a high solubility in the acid employed in the acidizing process, prevent precipitation of high levels of dissolved iron over a wide temperature range, and remain functional for several hours until the spent acid is pumped out of the formation.

SUMMARY OF THE INVENTION

This invention relates to a method of preventing the precipitation of an iron (II) salt or iron (III) salt from an acid or acid solution, comprising dissolving in said acid or acid solution a substance selected from the group consisting of 2-keto acids, salts of a 2-keto acid, esters of a 2-keto acid, 2,5-diketo acids, salts of a 2,5-diketo acid and esters of a 2,5-diketo acid, wherein said keto and diketo acids, salts and esters are derived from an aldohexose or an aldopentose.

This invention also relates to a method of acidizing an oil well, comprising forcing (e.g. pumping or injecting) into the oil well formation an acid or acid solution having dissolved in it a substance selected from the group consisting of 2-keto acids, salts of a 2-keto acid, esters of a 2-keto acid, 2,5-diketo acids, salts of a 2,5-diketo acid and esters of a 2,5-diketo acid, wherein said keto and diketo acids, salts and esters are derived from an aldohexose or an aldopentose.

This invention also relates to a method of maintaining the dissolution of an iron (II) salt or an iron (III) salt under oil well acidizing conditions, comprising forcing into an oil well formation an acid or acid solution having dissolved in it a substance selected from the group consisting of 2-keto acids, salts of a 2-keto acid, esters of a 2-keto acid, 2,5-diketo acids, salts of a 2,5-diketo acid and esters of a 2,5-diketo acid, wherein said keto and diketo acids, salts and esters are derived from an aldohexose or an aldopentose.

This invention also relates to a method of chelating ferric iron which is dissolved in an acid or acid solution under oil well acidizing conditions, comprising dissolving in said acid or acid solution prior to forcing said acid or acid solution into the oil well formation a substance selected from the group consisting of 2-keto acids, salts of a 2-keto acid, esters of a 2-keto acid, 2,5-diketo acids, salts of a 2,5-diketo acid and esters of a 2,5-diketo acid, wherein said keto and diketo acids, salts and esters are derived from an aldohexose or an aldopentose.

This invention also relates to a method of reducing ferric iron which is dissolved in an acid or acid solution under oil well acidizing conditions, comprising dissolving in said acid or acid solution prior to forcing said acid or acid solution into the oil well formation a substance selected from the group consisting of 2-keto acids, salts of a 2-keto acid, esters of a 2-keto acid, 2,5-diketo acids, salts of a 2,5-diketo acid and esters of a 2,5-diketo acid, wherein said keto and diketo acids, salts and esters are derived from an aldohexose or an aldopentose.

A preferred embodiment of this invention relates to a method of acidizing an oil well, comprising forcing into the oil well formation an acid or acid solution having dissolved in it a substance selected from the group consisting of 2-keto acids, salts of a 2-keto acid, esters of a 2-keto acid, 2,5-diketo acids, of a 2,5-diketo acid and esters of a 2,5-diketo acid, wherein said keto and diketo acids, salts and esters are derived from an aldohexose or an aldopentose, and wherein the oil well acidizing technique employed is matrix acidizing.

Another preferred embodiment of this invention relates to a method of maintaining the dissolution of an iron (II) salt or an iron (III) salt under oil well acidizing conditions, comprising forcing into an oil well formation an acid or acid solution having dissolved in it a substance selected from the group consisting of 2-keto acids, salts of a 2-keto acid, esters of a 2-keto acid, 2,5-diketo acids, salts of a 2,5-diketo acid and esters of a 2,5-diketo acid, wherein said keto and diketo acids, salts and esters are derived from an aldohexose or an aldopentose, and wherein the oil well acidizing technique employed is matrix acidizing.

Another preferred embodiment of this invention relates to a method of reducing ferric iron which is dissolved in an acid or acid solution under oil well acidizing conditions, comprising dissolving in said acid or acid solution prior to forcing said acid or acid solution into the oil well formation a substance selected from the group consisting of 2-keto acids, salts of a 2-keto acid, esters of a 2-keto acid, 2,5-diketo acids, salts of a 2,5-diketo acid and esters of a 2,5-diketo acid, wherein said keto and diketo acids, salts and esters are derived from an aldohexose or an aldopentose, and wherein the oil well acidizing technique employed is matrix acidizing.

Another preferred embodiment of this invention relates to a method of chelating ferric iron which is dissolved in an acid or acid solution under oil well acidizing conditions, comprising dissolving in said acid or acid solution prior to forcing said acid or acid solution into the oil well formation a substance selected from the group consisting of 2-keto acids, salts of a 2-keto acid, esters of a 2-keto acid, 2,5-diketo acids, salts of a 2,5-diketo acid and esters of a 2,5-diketo acid, wherein said keto and diketo acids, salts and esters are derived from an aldohexose or an aldopentose, and wherein the oil well acidizing technique employed is matrix acidizing.

Other preferred embodiments of the present invention are those methods described above wherein the substance utilized is a compound or salt having the formula $CH_2OH(CHOH)_mCOOR^1$ or $(CH_2OH(CHOH)_mCOO^-)_nR^2$, respectively, wherein m is 3 or 4, n is 1 or 2, $R^1$ is selected from the group consisting of hydrogen and ($C_1$-$C_6$) alkyl, and $R^2$ is selected from the group consisting of the alkali metal cations, the alkaline earth metal cations and $^+NHR^3R^4$ and $R^5$ are selected from the group consisting of hydrogen and ($C_1$-$C_6$) alkyl, and wherein either one or two of the —CHOH— group that comprises the $(CHOH)_m$ portion of the compound or salt is replaced by a

group to form, respectively a 2-keto or 2,5-diketo acid, ester or salt, with the proviso that n is 1 when $R^2$ is an alkali metal cation or an ammonium cation and n is 2 when $R^2$ is an alkaline earth metal cation.

More preferred embodiments of the present invention are the preferred methods referred to immediately above, wherein the compound or salt that is dissolved in the acid or acid solution is selected from the group consisting of 2-ketogluconic acid and 2-ketogluconates. Especially preferred are the same methods wherein the compound or salt that is dissolved in the acid or acid solution is sodium 2-ketogluconate, ammonium 2-ketogluconate or 2-ketogluconic acid.

Examples of other embodiments of the present invention are those methods described above wherein the compound or salt that is dissolved in the acid or acid solution is 2,5-diketogulonic acid, 2-ketogulonic acid or 2,5-diketogluconic acid.

DETAILED DESCRIPTION OF THE INVENTION

When the formation around oil producing wells become plugged with acid soluble minerals, the flow of fluid through the oil bearing formation is reduced and oil production falls. Wells can be stimulated to produce at higher levels by forcing acid into the formation to dissolve the minerals that are causing the problem. The acid readily dissolves iron and iron containing compounds both from the well casing and the formation.

Oil well acidizing is a term well-known to those skilled in the art of petroleum engineering. It includes such techniques or procedures as "acid washing", "matrix acidizing" and "acid fracturing", which are also well known to those skilled in the art. A description of these procedures and the conditions under which they are carried out is provided by Bert B. Williams, John L. Gidley and Robert S. Schechter in their book entitled "Acidizing Fundamentals", published by the Society of Petroleum Engineers of AIME, New York, 1979, which is incorporated herein by reference in its entirety.

Several of the preferred embodiments of this invention relate to methods that utilize a technique known as matrix acidizing. Matrix acidizing refers to the injection of acid into a formation porosity (intergrannular, vagular or fracture) at a pressure below that necessary to open a fracture. (See Williams et al., chap. 2, p. 5.) The purpose of matrix acidizing is to effect radial penetration of the acid into the formation to increase the permeability of the formation in a region of reduced permeability near the wellbore (due to damage) by enlarging pore spaces and dissolving particles clogging such spaces. (See Williams et al., chap. 2, p. 5.) Because matrix acidizing is done without fracturing the formation, it is often used to avoid a shale break or other disruption of a natural flow boundary that could result in the unwanted production of water or gas.

The specific oil well acidizing conditions employed (e.g., the rate and pressure of injection and the composition, volume and concentration of the acid) will vary depending on the temperature of the formation and the structural characteristics of the well or field (e.g., depth, reservoir pressure, permeability, and the radii of the wellbore and damage zone or region). The choice of these conditions in a given situation will be obvious to those skilled in the art of petroleum engineering. Williams et al., in chapters 9 and 10 of "Acidizing Fundamentals," referred to above, describe how to design and carry out appropriate matrix acidizing procedures for sandstone and carbonate formations, respectively.

The acids and acid solutions contemplated for use in connection with this invention are those that are generally used in oil well acidizing procedures. Such acids and acid solutions include hydrochloric acid, hydrofluoric acid, organic acids formic, acetic and propionic acids, and mixtures of two or more of the foregoing acids. When aqueous hydrochloric acid is used, it is generally used in a concentration of about 10% to about 30%.

The aldopentose and aldohexose derivatives contemplated for use in connection with this invention are generally used in a concentrations ranging from about 0.5% by weight of the acid solution in which they are dissolved to their maximum solubility in such solution.

Most acidizing procedures generally take from about 2 to about 22 hours, and are conducted at temperatures ranging from about 20° C. to about 130° C.

As indicated above, as the acid that is utilized in an acidizing procedure is neutralized by carbonates in the oil well formation, iron will re-precipitate as ferric hydroxide above a pH of 2.2 unless suitable chemicals are added to maintain it in a soluble state. An ideal additive for control of iron under oil well acidizing conditions should have a high solubility in the acid or acid solution employed in the acidizing process, prevent precipitation of high levels of dissolved iron over a wide temperature range, and remain functional for several hours until the spent acid or acid solution is pumped out of the formation. As illustrated in Examples 1 to 6 below, the aldohexose and aldopentose derivatives of the present invention meet all of the these criteria.

The present invention is illustrated by the following examples. It will be understood, however, that the invention is not limited to the specific details of these examples.

GENERAL EXPERIMENTAL PROCEDURE

A test solution was prepared by combining iron (as $FeCl_3.6H_2O$, predissolved in 15% HCl) and an additive and diluting to 100 g with 15% hydrochloric acid. A 1000 ml Erlenmeyer flask containing 70 g granular dolomitic limestone (42% $MgCO_3$, minimum assay, 53% $CaCO_3$, minimum assay) was immersed in an oil bath set for the test temperature, and into this flask was poured 100 g of the test solution. To minimize evaporative losses, the flask was capped with a rubber stopper through which a syringe needle was inserted to allow for escape of carbon dioxide. Samples withdrawn at intervals of 1, 2, 3, and 22 hours were passed through 0.22 micron filters, diluted and analyzed for total iron by atomic absorption spectroscopy and for ferrous iron by a colorimetric assay using 1,10-phenanthroline.

EXAMPLE 1

To evaluate the relative activity of commonly used iron control agents, test solutions containing 9.68 g (0.036 mole) $FeCl_3.6H_2O$ and an additive in the amount indicated in Table 1 (page 4) were diluted to 100 g with 15% HCl. Test solutions were treated according to the General Experimental Procedure described above. For the materials listed in Table 1, the amount of iron remaining in solution after 24 hours at various test temperatures is shown in Table 2. Erythorbic acid, ammonium-2-ketogluconate and 2-ketogluconic acid retained virtually the entire iron charge in solution after 24 hours at all temperatures tested. The slight increase in iron found in higher temperature experiments is likely due to slight evaporative losses over the 24 hour test period. The most effective chelating agents were EDTA and NTA, both of which showed intermediate activity across the temperature range employed. Iron chelation by citric acid and sodium gluconate was very good at room temperature. However, at higher temperature, these materials showed inferior iron control capabilities relative to the other substances tested.

TABLE 1

| ADDITIVE | ABBREVIATION | CHARGE WEIGHT (g) | MOLES CHARGED |
|---|---|---|---|
| 2-Ketogluconic acid | 2-ketoacid | 6.95 | 0.036 |
| Ammonium 2-ketogluconate | Am-2-keto | 7.52 | 0.036 |
| Ethylenediaminetetraacetic acid tetrasodium salt | EDTA | 13.61 | 0.036 |
| Citric acid | Citric | 6.87 | 0.036 |
| Nitrilotriacetic acid | NTA | 6.84 | 0.036 |
| Sodium gluconate | Na Glu | 7.81 | 0.036 |
| Erythorbic acid | Ery acid | 6.31 | 0.036 |

TABLE 2

PPM IRON REMAINING IN SOLUTION AFTER 22 HOURS

| Additive °C. | 23° C. | 50° C. | 70° C. | 90° C. |
|---|---|---|---|---|
| 2-Ketoacid | 19,300 | 22,800 | 23,000 | 20,900 |
| Am-2-keto | 18,700 | 21,900 | 21,900 | 21,300 |
| Ery Acid | 20,700 | 22,900 | 23,000 | 24,200 |
| Citric | 20,800 | 12,200 | 3,600 | 1,300 |
| EDTA | 20,700 | 18,100 | 18,300 | 8,900 |
| NTA | 17,300 | 11,500 | 15,200 | 14,000 |
| Na Glu | 21,100 | 0 | 0 | 0 |
| Blank | 3,300 | 400 | 400 | 300 |

The mechanism by which additives listed in Table 1 retain iron in solution varies with chemical structure and with temperature. Erythorbic acid is the most powerful reducing agent tested and is effective in reducing all iron present at room temperature. Citric acid, sodium gluconate, NTA and EDTA are not reducing agents for iron. Rather, they solubilize ferric iron by chelation. The 2-ketogluconic acid derivatives solubilize ferric iron at lower temperatures by chelation and at higher temperatures reduce ferric ion to ferrous ion. The relative effectiveness of various additives in reducing ferric iron is indicated in Table 3.

TABLE 3

PERCENT REDUCTION OF FERRIC ION TO FERROUS ION AFTER 22 HOURS

| ADDITIVE °C. | 23° C. | 50° C. | 70° C. | 90° C. |
|---|---|---|---|---|
| 2-Ketoacid | 10.8 | 75 | 88 | 100 |
| Am-2-keto | 11.7 | 81.5 | 89.2 | 100 |
| Ery Acid | 100 | 100 | 98 | 100 |
| NTA | 1.3 | 0.7 | 2.2 | 2.2 |

EXAMPLE 2

Iron reduction rate as a function of temperature was determined using the General Experimental Procedure and ammonium 2-ketogluconate as a representative example. The results are set forth in Table 4. The results show that while virtually no reduction occurs at room temperature, conversion to ferrous is complete within 24 hours at 50° C. At higher temperatures, the rate is substantially faster, reduction being complete within 3 hours at 70° C. and within 1 hour at 90° C.

TABLE 4

RATE OF REDUCTION OF FERRIC ION BY AMMONIUM 2-KETOGLUCONATE PPM FERROUS IRON

| TIME °C. | 50° C. | 70° C. | 90° C. |
|---|---|---|---|
| 0 hour | 0 | 0 | 0 |
| 1 hour | 935 | 12,650 | 23,055 |
| 2 hours | 1,840 | 17,665 | |
| 3 hours | 3,335 | 19,520 | |

TABLE 4-continued

RATE OF REDUCTION OF FERRIC ION BY
AMMONIUM 2-KETOGLUCONATE
PPM FERROUS IRON

| TIME °C. | 50° C. | 70° C. | 90° C. |
|---|---|---|---|
| 4 hours | 4,165 | | |
| 5 hours | 5,325 | | |
| 6 hours | 6,635 | | |
| 22 hours | 21,500 | 20,155 | 21,530 |

EXAMPLE 3

The effect of a molar overcharge on the ability of an additive to control iron was tested using the same conditions as in Example 1, except that the amount of additive was doubled. The results are set forth in Table 5. At 24 hours, acidizing solutions containing sodium gluconate and NTA showed improved iron control at the higher additive level, however, those prepared using citric did not. EDTA was not soluble beyond the 1:1 molar ratio and, therefore, not tested at the higher level. In order to test the limits of 2-ketoglucanates, a greater amount of iron is required.

TABLE 5

PPM IRON REMAINING IN SOLUTION AFTER 24 HOURS
(MOLAR RATIO ADDITIVE: IRON = 2:1)

| ADDITIVE °C. | 23° C. | 70° C. | 90° C. |
|---|---|---|---|
| 2-Ketoacid | 20,900 | 21,800 | 25,700 |
| Am-2-keto | 20,500 | 19,700 | 23,500 |
| Na Glu | 21,100 | 16,800 | 22,100 |
| Citric | 21,600 | 5,800 | 1,100 |
| NTA | 21,700 | 22,700 | 18,400 |
| Blank | 3,300 | 400 | 300 |

The following two examples are designed to determine how much iron could be controlled by a given dose of additive and to approximate the maximum amount of iron that could be controlled in an acidizing operation by the most effective additives.

EXAMPLE 4

Dose response profiles for ammonium-2-ketogluconate, erythorbic acid, EDTA, and NTA (trisodium salt) were determined using the General Experimental Procedure described above. In each experiment 9.68 g of $FeCl_3.6H_2O$ were added per 100 g of test solution to give a nominal 20,000 ppm Fe in the test solution, which was then spent on dolomitic lime at 90° C. for 24 hours. The amount of additive was varied between 2% and 8% on a solids basis. The results, which are set forth in Table 6, indicate that while not as effective as erythorbic acid, ammonium 2-ketogluconate is effective at a far lower concentration than either EDTA or NTA.

dia. The exceptional solubility of 2-ketogluconates in hydrochloric acid solutions is shown in Table 7. The solubility of 2-ketogluconates, coupled with their ability to chelate and reduce ferric ion, as demonstrated above, renders them capable of maintaining high levels of iron in solution. To demonstrate this effect, the solutions described in Table 8 containing 15% and 20% ammonium 2-ketogluconate and 15% and 20% sodium 2-ketogluconate were prepared and spent on 70 g of dolomitic lime for 22° hours at 90° C. Analysis of the filtered liquid showed iron present at 56,000 to 58,000 ppm, nearly equivalent to the nominal 60,000 ppm charged to the reaction flask.

By way of contrast, the highest amount of iron that could be controlled by NTA was somewhat less than 20,000 ppm and occurred under the conditions described in Example 3. Attempts to prepare test solutions containing higher levels of NTA either could not be made up due to limited solubility or failed to remain soluble over the 22 hour test period.

TABLE 7

2-KETOGLUCONATE SOLUBILITY AT 23° C.

| Conc. HCl Additive | Am-2-keto | Na-2-keto |
|---|---|---|
| 5% HCl | 46.7% | 50.8% |
| 10% HCl | 53.3% | 57.8% |
| 15% HCl | 72.5% | 54.7% |
| 20% HCl | 63.0% | 35.2% |
| 25% HCl | 30.7% | 8.1% |
| 30% HCl | 17.2% | 4.2% |

TABLE 8

| EXAMPLE | TEST SOLUTION COMPOSITION | | SOLUBLE FE, ppm at 22 HRS |
|---|---|---|---|
| 5a | Ammonium-2-ketogluconate | 15.0 g | 57,400 |
| | $FeCl_3.6H_2O$ | 29.1 g | |
| | 15% HCl | 55.9 g | |
| 5b | Ammonium-2-ketogluconate | 20.0 g | 57,800 |
| | $FeCl_3.6H_2O$ | 29.1 g | |
| | 15% HCl | 50.9 g | |
| 5c | Sodium-2-ketogluconate | 15.0 g | 56,200 |
| | $FeCl_3.6H_2O$ | 29.1 g | |
| | 15% HCl | 55.9 g | |
| 5d | Sodium-2-ketogluconate | 20.0 g | 56,800 |
| | $FeCl_3.6H_2O$ | 29.1 g | |
| | 15% HCl | 50.9 g | |

EXAMPLE 6

Iron control was shown to be possible with methyl-2-ketogluconate. Using the experimental procedure described in Example 1 and 7.45 g of methyl-2-ketogluconate as the additive, samples were removed at 1, 2, and 3 hours from flasks incubating at 70° and 90° C. The

TABLE 6

PPM (X1000) IRON REMAINING
IN SOLUTION AFTER 24 HOURS
AT 90° C.

ADDITIVE CONC. %

| ADDITIVE | 1.85 | 2.0 | 2.77 | 3.0 | 3.70 | 4.0 | 4.62 | 5.0 | 5.55 | 6.0 | 6.47 | 7.0 | 7.40 | 8.0 |
|---|---|---|---|---|---|---|---|---|---|---|---|---|---|---|
| Am-2-keto | | 11.5 | | 15.4 | | 23.6 | | 23.9 | | 21.6 | | 20.7 | | 21.5 |
| NA3NTA | 2.30 | | 4.20 | | 6.10 | | 10.2 | | 10.4 | | 13.1 | | 14.2 | |
| EDTA | | 2.10 | | 4.20 | | 4.60 | | 7.40 | | 7.20 | | 8.0 | | 10.1 |
| Erythorbic | | 24.4 | | 24.4 | | 21.6 | | 26.3 | | 21.3 | | 20.3 | | 20.9 |

EXAMPLE 5

The amount of iron controlled by some additives is limited by relatively low solubility in the acidizing mesamples were filtered and analyzed for both ferrous and total iron. The results are set forth in Table 9. While the data shows excellent iron control over the three hour test period, a sludge formed overnight and in neither case could soluble iron be determined at 22 hours.

TABLE 9

IRON CONTROL USING METHYL-2-KETOGLUCONATE

| Time, Hrs. | Soluble Iron (ppm) | | | |
|---|---|---|---|---|
| | 70° C. | | 90° C. | |
| | Fe III | Fe II | Fe III | Fe II |
| 1 | 20,700 | 10,000 | 22,400 | 22,100 |
| 2 | 18,800 | 13,500 | 21,700 | 22,100 |
| 3 | 21,900 | 15,500 | 22,000 | 22,100 |

We claim:

1. A method of preventing the precipitation of an iron (II) salt or iron (III) salt from an acid or acid solution containing said salt, comprising dissolving in said acid or acid solution a substance selected from the group consisting of 2-keto acids, salts of a 2-keto acid, esters of a 2-keto acid, 2,5-diketo acids, salts of a 2,5 diketo acid and esters of a 2,5-diketo acid, wherein said keto and diketo acids, salts and esters are derived from an aldohexose or an aldopentose.

2. A method of acidizing an oil well comprising forcing into the oil well formation an acid or acid solution having dissolved in it a substance selected from the group consisting of 2-keto acids, salts of a 2-keto acid, esters of a 2-keto acid, 2,5-diketo acids, salts of a 2,5 diketo acid and esters of a 2,5-diketo acid, wherein said keto and diketo acids, salts and esters are derived from an aldohexose or an aldopentose.

3. A method of maintaining the dissolution of an iron (II) salt or an iron (III) salt under oil well acidizing conditions, comprising forcing into an oil well formation an acid or acid solution having dissolved in it a substance selected from the group consisting of 2-keto acids, salts of a 2-keto acid, esters of a 2-keto acid, 2,5-diketo acids, salts of a 2,5 diketo acid and esters of a 2,5-diketo acid, wherein said keto and diketo acids, salts and esters are derived from an aldohexose or an aldopentose.

4. A method of chelating ferric ion which is dissolved in an acid or acid solution under oil well acidizing conditions, comprising dissolving in said acid or acid solution prior to forcing said acid or acid solution into the oil well formation a substance selected from the group consisting of 2-keto acids, salts of a 2-keto acid, esters of a 2-keto acid, 2,5-diketo acids, salts of a 2,5-diketo acid and esters of a 2,5-diketo acid, wherein said keto and diketo acids, salts and esters are derived from an aldohexose or an aldopentose, and then forcing said solution into said formation.

5. A method of reducing ferric ion which is dissolved in an acid or acid solution under oil well acidizing conditions, comprising dissolving in said acid or acid solution prior to forcing said acid or acid solution into the oil well formation, a substance selected from the group consisting of 2-keto acids, salts of a 2-keto acid, esters of a 2-keto acid, 2,5-diketo acids, salts of a 2,5-diketo acid and esters of a 2,5-diketo acid, wherein said keto and diketo acids, salts and esters are derived from an aldohexose or an aldopentose, and then forcing said solution into said formation.

6. A method according to claim 1, wherein said substance is a compound or salt having the formula $CH_2OH(CHOH)_mCOOR^1$ or $(CH_2OH(CHOH)_mCOO^-)_nR^2$, respectively, wherein m is 3 or 4, n is 1 or 2, $R^1$ is selected from the group consisting of hydrogen and ($C_1$-$C_6$) alkyl, and $R^2$ is selected from the group consisting of the alkali metal cations, the alkaline earth metal cations and $^+NHR^3R^4R^5$, wherein $R^3$, $R^4$ and $R^5$ are selected from the group consisting of hydrogen and ($C_1$-$C_6$) alkyl, and wherein either one or two of the —CHOH— groups that comprise the $(CHOH)_m$ portion of the compound or salt is replaced by a

group to form, respectively, a 2-keto or 2,5-diketo acid, ester or salt, with the proviso that n is 1 when $R^2$ is an alkali metal cation or an ammonium cation and n is 2 when $R^2$ is an alkaline earth metal cation.

7. A method according to claim 2, wherein said substance is a compound or salt having the formula $CH_2OH(CHOH)_mCOOR^1$ or $(CH_2OH(CHOH)_mCOO^-)_nR^2$, respectively, wherein m is 3 or 4, n is 1 or 2, $R^1$ is selected from the group consisting of hydrogen and ($C_1$-$C_6$) alkyl, and $R^2$ is selected from the group consisting of the alkali metal cations, the alkaline earth metal cations and $^{+NHR^3}R^4R^5$, wherein $R^3$, $R^4$ and $R^5$ are selected from the group consisting of hydrogen and ($C_1$-$C_6$) alkyl, and wherein either one or two of the —CHOH— groups that comprise the $(CHOH)_m$ portion of the compound or salt is replaced by a

group to form, respectively, a 2-keto or 2,5-diketo acid, ester or salt, with the proviso that n is 1 when $R^2$ is an alkali metal cation or an ammonium cation and n is 2 when $R^2$ is an alkaline earth metal cation.

8. A method according to claim 3, wherein said substance is a compound or salt having the formula $CH_2OH(CHOH)_mCOOR^1$ or $(CH_2OH(CHOH)_mCOO^-)_nR^2$, respectively, wherein m is 3 or 4, n is 1 or 2, $R^1$ is selected from the group consisting of hydrogen and ($C_1$-$C_6$) alkyl, and $R^2$ is selected from the group consisting of the alkali metal cations, the alkaline earth metal cations and $^+NHR^3R^4R^5$, wherein $R^3$, $R^4$ and $R^5$ are selected from the group consisting of hydrogen and ($C_1$-$C_6$) alkyl, and wherein either one or two of the —CHOH— groups that comprise the $(CHOH)_m$ portion of the compound or salt is replaced by a

group to form, respectively, a 2-keto or 2,5-diketo acid, ester or salt, with the proviso that n is 1 when $R^2$ is an alkali metal cation or an ammonium cation and n is 2 when $R^2$ is an alkaline earth metal cation.

9. A method according to claim 4, wherein said substance is a compound or salt having the formula $CH_2OH(CHOH)_mCOOR^1$ or $(CH_2OH(CHOH)_mCOO^-)_nR^2$, respectively, wherein m is 3 or 4, n is 1 or 2, $R^1$ is selected from the group consisting of hydrogen and ($C_1$-$C_6$) alkyl, and $R^2$ is selected from the group consisting of the alkali metal cations, the alkaline earth metal cations and $^+NHR^3R^4R^5$, wherein $R^3$, $R^4$ and $R^5$ are selected from the group consisting of hydrogen and ($C_1$-$C_6$) alkyl, and wherein either one or two of the —CHOH— groups that comprise the $(CHOH)_m$ portion of the compound or salt is replaced by a

group to form, respectively, a 2-keto or 2,5-diketo acid, ester or salt, with the proviso that n is 1 when $R^2$ is an alkali metal cation or an ammonium cation and n is 2 when $R^2$ is an alkaline earth metal cation.

10. A method according to claim 5, wherein said substance is a compound or salt having the formula $CH_2OH(CHOH)_mCOOR^1$ or $(CH_2OH(CHOH)_mCOO^-)_nR^2$, respectively, wherein m is 3 or 4, n is 1 or 2, $R^1$ is selected from the group consisting of hydrogen and $(C_1-C_6)$ alkyl, and $R^2$ is selected from the group consisting of the alkali metal cations, the alkaline earth metal cations and $^+NHR^3R^4R^5$, wherein $R^3$, $R^4$ and $R^5$ are selected from the group consisting of hydrogen and $(C_1-C_6)$ alkyl, and wherein either one or two of the —CHOH— groups that comprise the $(CHOH)_m$ portion of the compound or salt is replaced by a

group to form, respectively, a 2-keto or 2,5-diketo acid, ester or salt, with the proviso that n is 1 when $R^2$ is an alkali metal cation or an ammonium cation and n is 2 when $R^2$ is an alkaline earth metal cation.

11. A method according to claim 6, wherein said substance is selected from the group consisting of 2-ketogluconic acid and 2-ketogluconates.

12. A method according to claim 7, wherein said substance is selected from the group consisting of 2-ketogluconic acid and 2-ketogluconates.

13. A method according to claim 8, wherein said substance is selected from the group consisting of 2-ketogluconic acid and 2-ketogluconates.

14. A method according to claim 9, wherein said substance is selected from the group consisting of 2-ketogluconic acid and 2-ketogluconates.

15. A method according to claim 10, wherein said substance is selected from the group consisting of 2-ketogluconic acid and 2-ketogluconates.

16. A method according to claim 11, wherein said substance is 2-ketogluconic acid.

17. A method according to claim 11, wherein said substance is ammonium 2-ketogluconate.

18. A method according to claim 11, wherein said substance is sodium 2-ketogluconate.

19. A method according to claim 12, wherein said substance is 2-ketogluconic acid.

20. A method according to claim 12, wherein said substance is ammonium 2-ketogluconate.

21. A method according to claim 12, wherein said substance is sodium 2-ketogluconate.

22. A method according to claim 13, wherein said substance is 2-ketogluconic acid.

23. A method according to claim 13, wherein said substance is ammonium 2-ketogluconate.

24. A method according to claim 13, wherein said substance is sodium 2-ketogluconate.

25. A method according to claim 14, wherein said substance is 2-ketogluconic acid.

26. A method according to claim 14, wherein said substance is ammonium 2-ketogluconate.

27. A method according to claim 14, wherein said substance is sodium 2-ketogluconate.

28. A method according to claim 15, wherein said substance is 2-ketogluconic acid.

29. A method according to claim 15, wherein said substance is ammonium 2-ketogluconate.

30. A method according to claim 15, wherein said substance is sodium 2-ketogluconate.

31. A method according to claim 2, wherein the oil well acidizing technique employed is matrix acidizing.

32. A method according to claim 3, wherein the oil well acidizing technique employed is matrix acidizing.

33. A method according to claim 4, wherein the oil well acidizing technique employed is matrix acidizing.

34. A method according to claim 5, wherein the oil well acidizing technique employed is matrix acidizing.

* * * * *